United States Patent [19]
Blakey et al.

[11] 3,722,360
[45] Mar. 27, 1973

[54] MEASURING AND LOCATING METHOD

[75] Inventors: Alexander G. Blakey; Jack S. Adams; James J. Swarts, all of San Diego, Calif.

[73] Assignee: General Dynamics Corporation, San Diego, Calif.

[22] Filed: Mar. 19, 1971

[21] Appl. No.: 126,023

Related U.S. Application Data

[63] Continuation-in-part of Ser. No. 821,587, May 5, 1969.

[52] U.S. Cl. ........................90/11 C, 408/1, 33/172 R, 33/180 R, 33/174 H, 335/285
[51] Int. Cl. ..........................B23b 35/00, B23d 79/00
[58] Field of Search..33/180 R, 185 R, 174 A, 174 H, 33/174 L, 174 PA, 174 P, 172 R, 170, 169 R; 335/285

[56] References Cited

UNITED STATES PATENTS

| | | | |
|---|---|---|---|
| 2,201,454 | 5/1940 | Reich | 33/174 H |
| 2,913,830 | 11/1959 | Schroter | 33/174 H |
| 2,926,427 | 3/1960 | Hostetler | 33/174 H |
| 3,046,665 | 7/1962 | Nilsson | 33/174 L X |
| 3,188,078 | 6/1965 | Peterson | 33/170 X |

Primary Examiner—William D. Martin, Jr.
Attorney—John R. Duncan

[57] ABSTRACT

A method of using a measuring and locating system utilizing a novel surface plate and fixtures associated therewith is disclosed. Basically, a plurality of uniform recesses are formed in a surface. At least one ferromagnetic member having an exterior shape corresponding to the shape of the recesses is placed in a recess and secured to a measuring and/or locating fixture. Magnetic attraction means are provided adjacent to recesses to aid in holding ferromagnetic members in place. The fixture may be easily removed by overcoming the magnetic attraction forces and replaced in exactly the same position. This method is useful for dimensional measurement of workpieces, locating workpieces for automatic machining operations, etc.

20 Claims, 11 Drawing Figures

INVENTORS.
ALEXANDER G. BLAKEY
JACK S. ADAMS
BY JAMES J. SWARTS

John R. Duncan
ATTORNEY.

INVENTORS,
ALEXANDER G. BLAKEY
JACK S. ADAMS
BY JAMES J. SWARTS

*John R. Duncan*
ATTORNEY.

MEASURING AND LOCATING METHOD

CROSS REFERENCE TO RELATED APPLICATION

This application is a continuation-in-part of our co-pending application Ser. No. 821,587, filed May 5, 1969.

BACKGROUND OF THE INVENTION

Conventional surface plates generally consist of thick slabs of stone or other materials having a precisely flat upper surface. The flat surface is used to dimensionally check machines, cast or otherwise formed parts. Early surface plates were used primarily for height gage measurements from the plate surface to various points on a specimen part placed on the surface.

As parts become more complicated and dimensional requirements become more stringent, special inspection tools and locating fixtures were developed, permitting the precision checking of parts or workpieces for diameter, concentricity, contours, tangent point, parallelism, squareness, taper, depth of machining, etc., in a single setup. In order to accomplish these tasks the inspection tools used in dimensionally checking specimen part to blueprint requirements must be precisely located relative to the part and to the surface plate by various holding and locating fixtures. These holding and locating fixtures are made of massive, heavy materials because location is maintained solely by friction against the smooth plate surface. The mass of such fixtures is a serious limitation for inspection of small parts, and their weight is a handling problem for inspection personnel each time a new setup is made. Light weight fixtures utilizing magnetized bases require that the surface plate be constructed of a ferromagnetic material. Such materials when compared to granite or other stone materials have the disadvantages of being more dimensionally sensitive to temperature changes, easily scratched, and, of greatest concern, have a tendency to continually rust which in a short time destroys the precision ground flat surface.

Up to the present time, the most satisfactory solution to the problems described has been the utilization of granite and other stone-type plates with clearance holes or tapped holes in the plate and bolts to hold the fixtures firmly in place. With such an arrangement it is not possible to preset a precision setup so that the fixtures may be placed at various locations on the surface plate or on another surface plate and bolted down, without making many setup adjustments. This is because of the dimensional buildup caused by dimensional tolerances of the fixture hole diameter, bolt shank diameter, bolt thread dimensions and concentricity with bolt shank, the tapped hole or clearance hole in the table, and finally, one of the greatest contributors, the repeatability of the hole pattern across the entire surface plate as well as with other surface plates. Because of these dimensional build-ups few attempts at preset precision setups of fixtures have proved successful, unless the fixtures are located on the same plate at the same position each time the setup is made.

Similar problems occur in the machining of parts with automatic equipment, such as numerically controlled milling machines. In many such machines, the part must be very precisely located on and secured to the surface of a table or carriage which carries the part through the machining operation. Misalignment of the part on the table may result in incorrect machining.

The inspection fixtures and alignment devices required for use with conventional surface plates are often complex and require highly skilled labor to properly locate them on the surface plate and to maintain them in the proper locations during extended inspection or machining operations. Where a fixture is to be used with tapped holes in a surface plate, it must have adjustable components to locate the inspection means relative to the hole. Adjusting and maintaining adjustment of such fixtures is often difficult and time consuming. Fixtures which interfere with the removal and replacement of workpieces to be inspected or machined must be removed, replaced and readjusted for each workpiece. These operations are tedious and error-prone where a series of similar workpieces must be handled.

Thus, there is a continuing need for improvements in inspection, measuring and locating methods using surface plates.

SUMMARY OF THE INVENTION

It is, therefore, an object of this invention to provide a surface plate measuring and locating system overcoming the above-noted problems.

Another object of this invention is to provide a method for assembling a surface plate measuring and locating system of improved simplicity, accuracy and reliability.

Still another object of this invention is to provide an improved measuring and locating method utilizing surface plates.

The above objects, and others, are accomplished in accordance with this invention by a measuring system which basically comprises steps of forming a plurality of spaced uniform recesses in a surface, providing a magnetic attraction means at each recess, placing at least one ferromagnetic support member having an exterior shape corresponding to said recesses in at least one of said recesses, placing an inspection or alignment fixture in contact with the support member or members and in the desired position taken from a blueprint or relative to a workpiece, part to be machined, etc., then securing the fixture to the support member or members. The fixture may then be removed and replaced at will, with the fixture always being easily returnable to the same position. While this system is generally identified herein as a "measuring and locating system", it should be understood that this includes the use of the disclosed apparatus and methods for the inspection of parts, measuring of dimensions, locating of workpieces relative to tables or carriages during machining, etc. In general, the "measuring" system utilizes a number of inspection and locating fixtures to perform these operations.

The surface bearing the recess array may have any suitable shape. For most purposes, a substantially planar surface is preferred, since it provides an accurate reference plane and is useful for a wide variety of operations. However, cylindrical, spherical, toroidal, etc. surfaces may be desirable for certain specialized purposes. For example, a ring-like plate, with recesses formed on the inner surface, may find special utility in measuring dimensions of ring gears, etc., where fixtures located along the inner ring surface extend inwardly to engage the gear teeth. However, since planar surfaces have the widest capability range, the following description will be primarily directed to planar surface plates.

Where it is desired to swing the fixture along an arc parallel to the table surface, generally the fixture will be secured to only one support member, which will have a shape permitting rotation within the recess. Where it is desired to pivot the fixture along an arc in a plane perpendicular to the plate surface, generally the fixture will be secured to at least two support members along a straight line and the members will have a shape (such as spherical) which permits such rotation in the recesses. Where it is desired that the fixture be held in a single position, generally three or more support members will be secured to the fixture at spaced points not along a single line, and the members may have any suitable shape.

Four support members located other than along a straight line have been found to produce optimum results with most fixtures where firm, exact positioning is desired. With four supports, if a particle of foreign matter prevents seating of one member in a recess, the fixture will "rock" slightly, so that the operator will know that the fixture should be removed and the recesses cleaned. With most recess shapes, merely wiping the recess with a finger tip is sufficient. Alternatively, a bit of adhesive tape may be pressed into the recess to pick up the foreign object.

When the support members are secured to the fixture and placed in corresponding recesses, the fixture will be restricted from sliding along the plate surface. However, the fixture can be displaced by a reasonable upward force for removal and replacement. The magnets at the recesses in cooperation with the ferromagnetic members hold the fixtures in place and prevent accidental displacement. The magnetic attraction forces may be provided by permanent magnets or electromagnets located at or adjacent to the recesses.

The member-receiving recesses may be formed in any suitable manner. Typically, the recesses may be formed directly in the plate surface by a conventional milling or grinding process. The magnetic attraction means, such as permanent magnets or electromagnets may be placed against the back of the plate, or in openings in the back of the plate adjacent each recess. In an especially preferred embodiment, openings are formed in the plate and inserts carrying the member-receiving recesses and magnetic attraction means are secured in the openings. Details of this and other recess embodiments are provided below.

The surface plates may comprise any suitable material. Granite and other stone materials are generally preferred because of their dimensional stability during temperature changes and their non-magnetic characteristics. Aluminum, reinforced plastics, or other non-magnetic materials are also desirable for many applications.

Any suitable configuration and material may be used for the fixture-supporting members. The members could be, for example, spherical, conical, cylindrical, etc. Spherical members are generally preferred since small ferromagnetic spheres of the sort used as ball bearings are readily available, will precisely seat in a spherical recess and can be rotated against the seat in any direction. The support members may comprise any suitable ferromagnetic material. Steel is generally preferred because of its machinability, hardness and magnetic properties. The members may have a thin surface layer of non-magnetic material, such as chromium or a fluorocarbon resin, if desired.

BRIEF DESCRIPTION OF THE DRAWING

Details of the invention, and of several preferred embodiments thereof, will be further understood upon reference to the drawing, wherein.

DETAILED DESCRIPTION OF THE INVENTION

Figure 1:
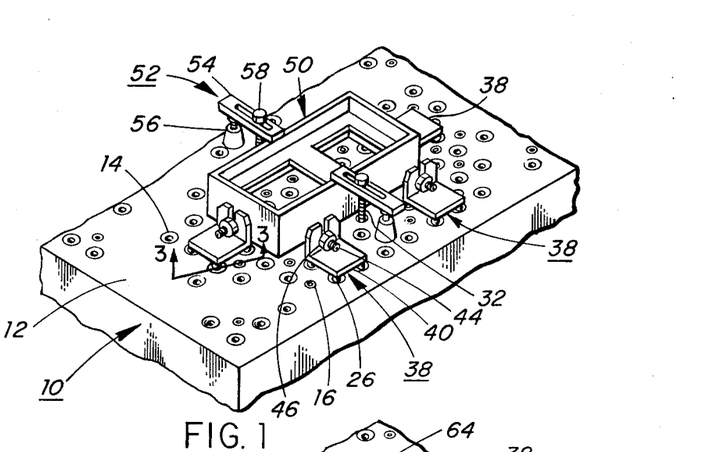
FIG. 1 is a perspective view illustrating an inspection operation according to the method of this invention.

Referring now to FIG. 1, there is seen a surface plate generally designated 10 having a substantially planar upper surface 12. A plurality of spaced openings 14 are formed in surface 12 by any conventional method, such as drilling or milling. While openings 14 may be randomly distributed across surface 12, they are preferably located in a uniform geometric pattern. With a random pattern, a fixture may be located relative to a selected group of openings 14, as discussed below, and may be removed and replaced with a high degree of accuracy. However, it will only fit at that single location. If it is desired to move the fixture from place to place along plate 10, or to move it to another similar plate, the spacing of openings 14 should follow a uniform highly accurate pattern. In that case, the fixture assembled at one location along surface 12 will properly fit at other locations. Since this increases the usefulness of the plate, it is preferred that the openings 14 be formed in a predetermined geometric pattern. As discussed below, where inserts are placed in the openings, highly accurate spacing of inserts can be obtained without requiring that openings 14 be formed with such highly accurate spacing.

If desired, a plurality of additional openings 16, generally smaller in diameter, can be formed in surface 12 for other purposes, such as for the threaded inserts described below.

Figure 2:
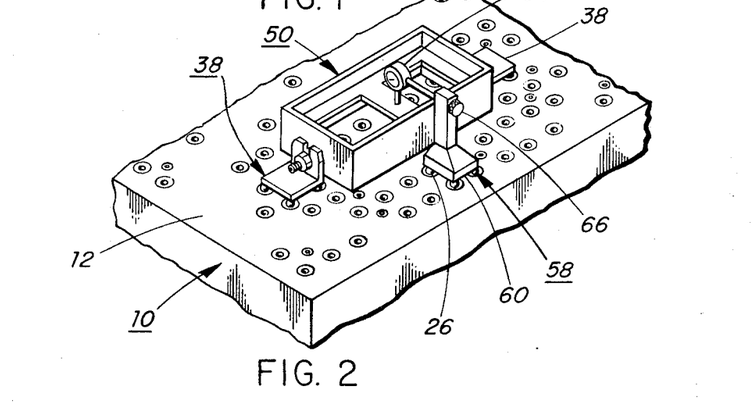
FIG. 2 is a perspective view illustrating another inspection operation according to the method of this invention.
Figure 3:
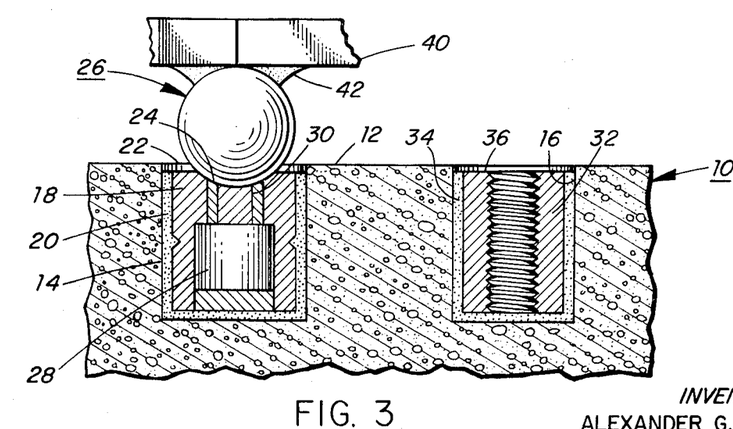
FIG. 3 is a cross-sectional view through a portion of a surface plate as assembled by the method of this invention taken on line 3-3 in FIG. 1.

In order to understand the inspection method illustrated in FIGS. 1 and 2, brief reference should first be made to FIG. 3, which shows a cross-section through a portion of the plate, taken on line 3—3 in FIG. 1. Positioned within opening 14 in this embodiment is a magnetic attraction insert 18. Opening 14 is larger than magnetic means 18 to allow exact positioning of insert 18 before filler 20 is added. Filler 20 may comprise any suitable material which will securely hold magnetic insert 18 in place. Typical fillers include synthetic casting resins, adhesives, inorganic cements, solders, etc. Preferably, the upper surface of magnetic insert 18 is located slightly below the plane of surface 12 so that surface 12 can be lapped to remove scratches without affecting the inserts. A recess 24, spherical in this case, is provided in the upper surface of magnetic insert 18 to receive the fixture mounting member which, in this case, is a ferromagnetic sphere 26. Sphere 26 is secured to a fixture body 40 by adhesive 42. Any suitable bonding agent may be used. Typical materials include solder and synthetic resin adhesives. Epoxy resin adhesives are preferred, since they bond readily to the metal surfaces and cure to a rigid, strong bond at room temperature. If desired, however, the bond may be broken and the resin removed from the fixture and support member, permitting re-use of these components. As illustrated, magnetic insert 18 includes a permanent magnet 28 and a non-magnetic spacer 30 to set up the desired magnetic field to hold ferromagnetic sphere 26 in recess 24. The magnetic means may have any suitable configuration. Typically, the entire insert could consist of the magnetic material, with the recess formed directly in its upper surface, or insert 18 could be a block or cylinder of non-magnetic material such as a plastic, brass or aluminum, with the member-receiving recess formed in its upper surface and a cavity in its lower surface to receive a permanent magnet or an electromagnet. Further variations of this assembly are illustrated in FIGS. 6-11, an especially preferred version being shown in FIGS. 6 and 7.

Also shown in FIG. 3 is a cross-sectional view of a typical accessory opening 16, in this case containing a threaded insert 32. Insert 32 is smaller than opening 16 to permit fixing it in place with a filler material 34, which, as discussed above, is preferably an epoxy resin. While threaded inserts of this type have long been used, in cooperation with the magnetic fixture mounting they provide several unique capabilities. Preferably, the upper surfaces of inserts 32 should be slightly below the plane of surface 12 to permit the surface of the plate to be reground to remove scratches, etc.

Methods of assembling and using the measuring and locating system of the present invention will be further understood by referring again to FIGS. 1 and 2. A number of locating fixtures 38 are shown in FIG. 1. Locating fixtures 38 each include a fixture body 40 that is supported by members (here, ferromagnetic spheres) 26 which are secured to body 40 by any suitable method such as adhesive bonding or brazing. An adjustable pin 44 is locked into checking position on an upright portion of body 40 by lock nuts 46 on each side of the upright portion. A workpiece 50 is placed on plate 10 and held securely in place by means of a retaining clamp assembly 52 including a clamp 54 which is supported by a jack 56 and is held in place by a bolt 58 inserted into a threaded insert 32.

The system may be assembled for use as shown in FIG. 1 by first clamping a master workpiece 50 in place on plate 10. Next, locating fixtures 38 are prepared. Fixture bodies 40 of sizes appropriate for workpiece 50 at the points to be located and measured are selected. Spheres 26 are placed in recesses at the selected locations. Preferably, four or more spheres are used to support each fixture body. The fixture bodies are then secured to the spheres, such as with an epoxy adhesive. Adjustable pins 44 are then moved into contact with workpiece 50 (or, if desired, to a suitable distance from workpiece 50 by inserting a suitable spacer therebetween) and locked in place with lock nuts 46. Locating fixtures 38 may then be removed from plate 10 by lifting them away, overcoming the magnetic forces holding them in place. The master workpiece 50 is removed and replaced with a workpiece 50 to be measured. Fixtures 38 serve, as they are replaced, to position workpiece in exactly the same position as the master. Any differences in the workpieces can be readily seen as variations in spacing between pins 44 and the master and test workpieces.

Other setup techniques may be used, if desired. It is especially preferred to pre-assemble a group or series of fixtures 38 and pre-set adjustable pins 44, or set other gaging devices, oriented to selected blueprint dimensions of workpieces 50 to be measured. Each pre-assembled fixture 38 of the group or series is indexed and identified with a specific selected pattern of recesses on plate 10 oriented to the blueprint geometry of workpiece 50. The group of fixtures 38 are then placed in the selected pattern of recesses on plate 10 and the workpieces 50 are successively measured. Subsequently, the group of pre-assembled fixtures 38 are removed from plate 10 and stored as a workpiece oriented kit to be retained and used with future production orders of the same workpiece geometry. With this technique, it is possible to pre-set the sets of fixtures, for example in a tool-and-die shop, then send them to other locations for use with other similar surface plates having identical recess shapes and spacing.

This ability to precisely locate a number of workpieces successively in exactly the same position on surface 12 is also useful where machining or other operations are to be performed on workpiece 50. Clamp assemblies 52 can be used to hold a workpiece firmly in position after the proper position has been located by fixtures 38. This is especially useful where numerically controlled milling, drilling, etc., is to be done, since precise alignment of workpieces relative to the machining table is essential to consistent results.

FIG. 2 illustrates the assembly and use of the system for checking the thickness or height dimensions of a workpiece 50. A plurality of locating fixtures 38 may be used to locate and position workpiece 50 in place in the manner described above. The height measurement test utilizes a gage fixture 58 consisting of a body 60 supported on a plurality of members 26 which are secured to body 60. A gage 64 is attached to gage fixture body 60 and adjusted by gage adjustment control 66. In the manner discussed above, gage fixture 58 is assembled by placing a plurality of spheres 26 in recesses in plate 10, locating body 60 in the desired position over the spheres, then adhesively bonding spheres 26 to body 60. Gage 64 may be adjusted relative to a master workpiece, blueprint dimensions or any other standard. Gage fixture 58 can be easily removed and replaced when changing workpieces so as to permit rapid, accurate measurement of the height of successive workpieces.

As is apparent from the exemplary embodiments shown in FIGS. 1 and 2, this system is adaptable to many locating and measuring requirements. Since these locating and measuring fixtures can be easily removed and replaced in exactly the same position, a number of workpieces can be rapidly handled. Where recesses are formed in a precise geometric array across surface 12, locating and measuring fixtures assembled on one plate 10 can be removed and used on other identical plates. The assembly and use of this system is simple, flexible and rapid.

As shown in FIGS. 1 and 2, where it is desired that the fixtures be rigidly mounted on the plate surface, it is preferred that each fixture be mounted on a plurality of members which are not located on a single straight line. As discussed above, optimum results are generally obtained where four support members support each fixture.

Figure 4:
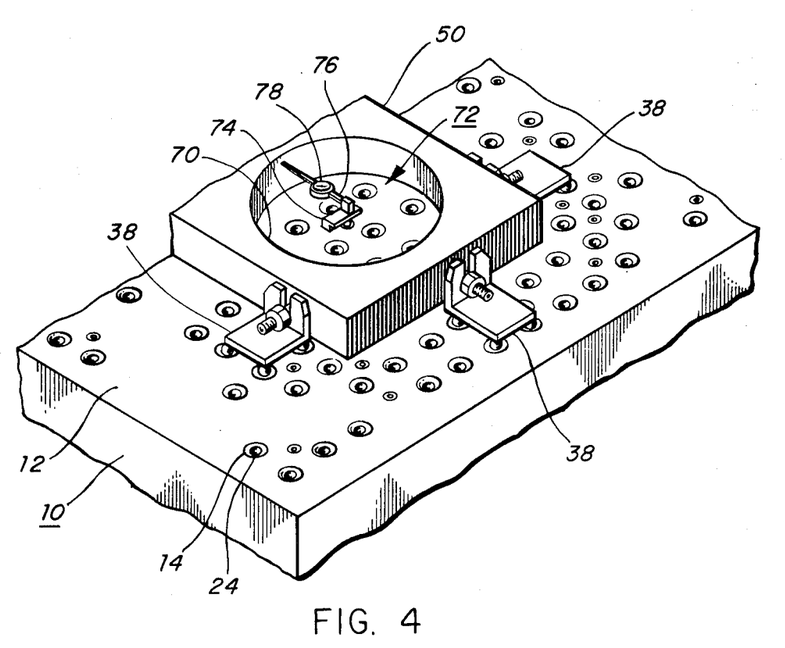
FIG. 4 is a perspective view illustrating a rotatable measuring and locating fixture arrangement.
Figure 5:
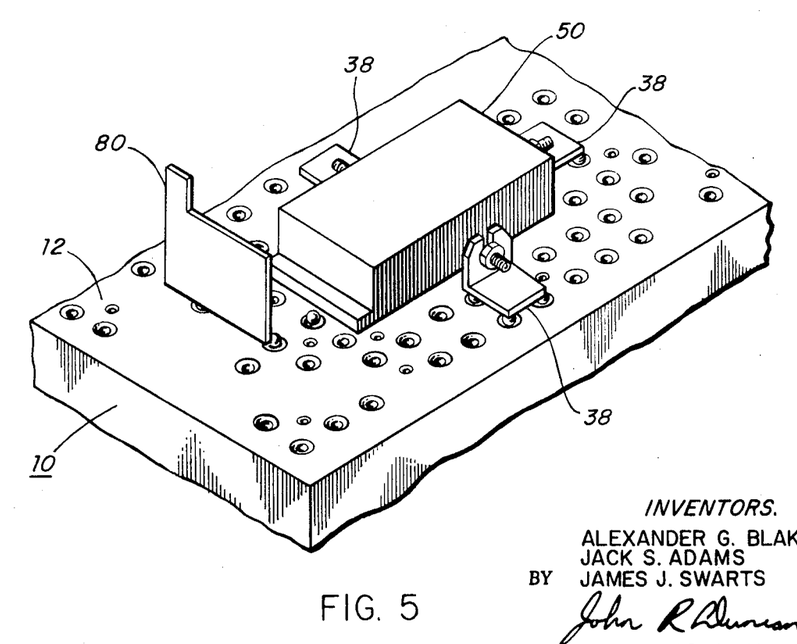
FIG. 5 is a perspective view illustrating a tiltable inspecting and locating fixture arrangement.

FIGS. 4 and 5 illustrate embodiments in which fixtures are assembled so as to allow movement relative to the plate surface during use.

Often, it is desirable to measure the uniformity of circular openings, etc., in a workpiece. As illustrated in FIG. 4, using our novel system, a measuring fixture 72 to accomplish this is easily assembled and used. A master workpiece 50 is placed on plate surface 12 and located by means of locating fixtures 38 in the manner described above. Workpiece 50 is located so that one recess 24 is located at the center of circular workpiece opening 70.

A measuring fixture 72 is assembled and located at the center of opening 70. Fixture 72 consists of a single support member 26 emplaced in recess 24 at the center of opening 70 which is bonded to a fixture body 74 which also carries a vertically adjustable horizontal arm 76 having an outwardly directed adjustable feeler or indicator gate 78 at its end. The member 26 must be capable of rotating in its recess in a plane parallel to the surface of plate 10, so that it should be spherical, cylindrical or conical in shape. Rotation of fixture 72 will show whether the opening 70 is in the proper location and is properly circular. It is especially preferred, however, to pre-assemble measuring fixture 72 and pre-set arm 76 and outwardly-directed feeler or indicator gage 78, oriented to the blueprint geometry of workpiece 50. The pre-set measuring fixture 72 is then used with other pre-assembled fixtures 38 to successively measure quantities of workpieces in the manner described above. Of course, other gages can be used to measure other dimensions at the same time.

Another embodiment of a fixture assembly illustrating the present invention is shown in FIG. 5. In some cases, it may be undesirable to remove a locating or measuring fixture entirely from the plate surface during workpiece replacement. However, it may be necessary to move part of a locating fixture out of the way of some part of a workpiece, such as an extending flange or other interfering portion, to permit rapid testing or machining of a series of similar workpieces. As seen in FIG. 5, a master workpiece 50 may be placed on the plate surface 12, a number of support members 26 may be placed in recesses 24 adjacent workpiece 50, and locating fixture 80 may be placed in the desired position on members 26 adjacent workpiece 50. In this embodiment, two or more members 26 are placed in a straight line near one edge of fixture 80, with other members 26 off of this line, nearer workpiece 50. Fixture 80 may be bonded to all of these members 26, or only to those along the line, if desired. Thus, fixture 80 may be pivoted or hinged along this line, to pivot it upwardly away from workpiece 80 during workpiece replacement. The fixture 80 is shown pivoted upwardly in FIG. 5. After a new workpiece 50 has been placed on plate surface 12, fixture 80 is pivoted downwardly, then workpiece 50 can be checked to properly align with fixture 80. Where fixture 80 is bonded to all support members 26, those members away from the pivot or hinge line are lifted away from, then returned to, their respective recesses 24. Where fixture 80 is not bonded to these members, the fixture body only pivots, leaving these members 26 in their recesses. When returned to the measuring position, the fixture body rests partially on these members 26. This permits very rapid exchange of workpieces. Of course, members 26 must have a shape which permits the pivoting action in recesses 24. Preferably, the shape of members 26 is either spherical or cylindrical with the cylinder axes along the desired pivot line.

While several preferred fixtures and methods of assembling and using them have been described in detail, those skilled in the art will recognize that there are many other possible variations in which locating and measuring fixtures and bonded to one or more members adapted to cooperate with recesses as described above.

Also, there are a number of ways in which the supporting members, cooperating recesses and magnetic attraction means may be assembled. Several alternative embodiments are shown in FIG. 3, as described above, and in FIGS. 6–11.

Figure 6:
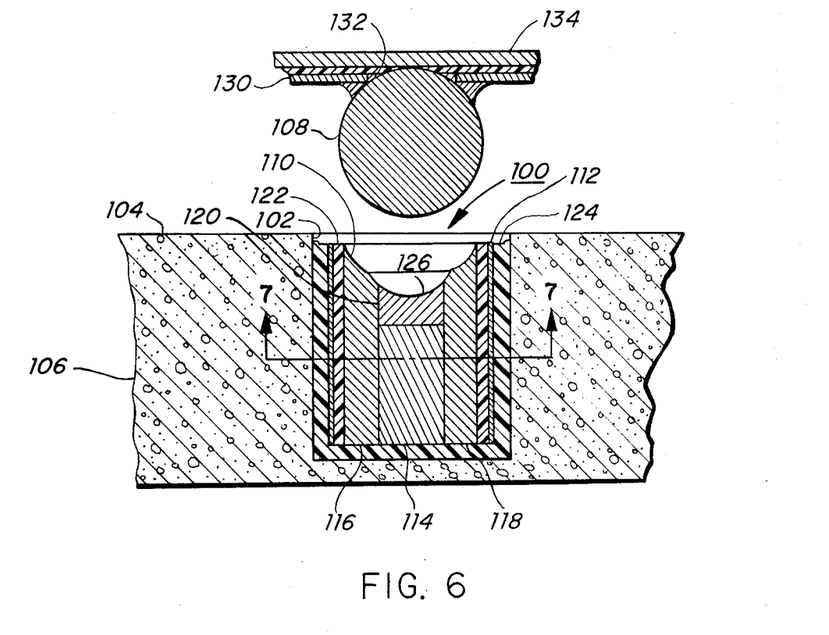
FIG. 6 is a vertical section through an especially preferred support member and recess assembly.
Figure 7:
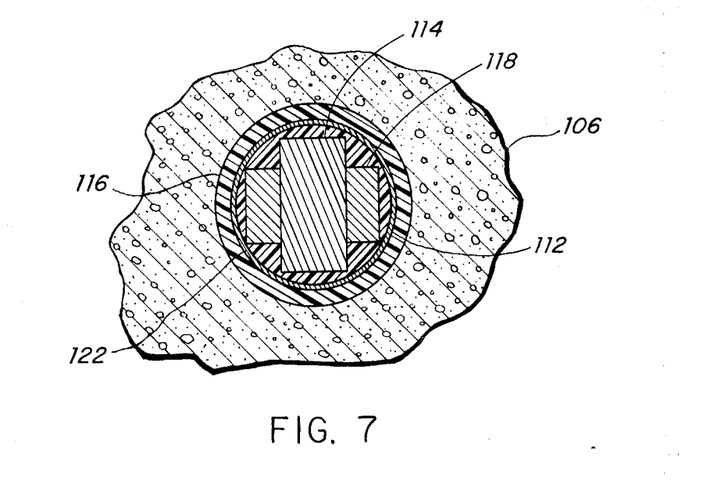
FIG. 7 is a horizontal section through the recess assembly of FIG. 6, taken on line 7—7 in FIG. 6.

An especially preferred embodiment of the recessed magnetic attraction means and of the cooperating support member is shown in FIGS. 6 and 7. This arrangement is simple, effective and versatile. The recessed magnetic attraction means is in the form of an insert 100 secured in an opening or hole 102 in the planar surface 104 of a surface plate 106. The support member is a ferromagnetic sphere 108 having a surface shape conforming to recess 110 in insert 100.

Insert 100 consists of a thin tube 112 containing a permanent magnetic 114, two ferromagnetic pole pieces 116 and 118 in contact with magnet 114, and a non-magnetic filler block 120. The remaining space within tube 112 is filled with a filler material 122. While any suitable material may be used for pole pieces 116 and 118 and filler block 120, it is preferred that pole pieces 116 and 118 be formed from a ferromagnetic stainless steel and filler block 120 from a non-magnetic stainless steel. These materials provide an easily formed, corrosion-resistant surface for recess 110. While filler material 122 may comprise any suitable material, synthetic resins such as epoxy resins are preferred since they are strong and easily cast in place. Filler block 120 separates poles 116 and 118, increasing the magnetic field therebetween, into which sphere 108 extends. If desired, a thin sheet of metal may close the end of tube 112 with pole pieces 116 and 118 and filler block 120 abutting the closure. Then, recess 110 is formed directly through the closure into the ends of pole pieces 116 and 118 and filler block 120. This improves the appearance of the recessed end of insert 100 somewhat, although it has little effect on the operation of the insert.

Insert 100 is carefully located at the exact desired position in opening 102 and the intervening space is filled with a filler material 124. This filler may constitute any suitable material. Typical fillers include synthetic resins, such as epoxy resins, solder, inorganic cements, etc. Preferably, the upper surface of insert 100 is located just below the plane of surface 104. This permits the lapping of surface 104, should it become worn or scratched, without affecting insert 100, and prevents insert 100 from accidentally projecting slightly above surface 104, which might interfere with parts placed on surface 104. Best results are obtained where the upper surface of insert 100 is maintained from about 0.001 to about 0.2 inch below the plane of surface 104. A spacing within this range may be selected depending upon plate material and the frequency of resurfacing required.

Inserts 100 may be positioned within openings 102 during the bonding operation by any suitable means. One technic which is both simple and effective uses a master sheet to which a number of support members are fixed in the desired pattern with a very high degree of accuracy. Then, inserts 100 are brought into contact with the support members, to which they adhere by magnetic attraction. A small amount of filler material 124 is placed in each of a corresponding pattern of openings 102, the master is positioned over the openings 102 with the inserts 100 extending downwardly and the master is lowered until the inserts are positioned within the openings. After the filler hardens, the master is removed. To align a large number of inserts across a large plate, inserts may be placed on only part of the master support members and the above installation steps repeated, with those master support members which do not carry additional inserts being brought into contact with previously installed inserts along the edge of the previously installed group of inserts. A very great number of inserts may be installed in a highly accurate pattern using this step-and-repeat sequence.

As mentioned above, the upper surface of insert 100 is recessed at 110 to conform to the surface of sphere 108. Since pole pieces 116 and 118 extend along opposite sides of this recess, sphere 108 is strongly attracted and held in place when placed in the recess.

Preferably, the center portion of insert 100 is more deeply recessed at 126 so that this area is out of contact with sphere 108 when it is placed in recess 110. The resulting slight gap between a seated sphere 108 and depression 126 provides space for a small amount of dust without interfering with the seating of sphere 108 against recess 110. It has been found that this gap does not seriously adversely affect the strength of the magnetic attraction holding sphere 108 in recess 110, since the pole pieces 116 and 118 provide nearly all of the holding force.

The spherical shape shown in FIG. 6 is strongly preferred for support member 108. Precision ferromagnetic spheres are easily and economically manufactured to the required tolerances. Spheres are easily registered in complementary recesses and are strongly held by the magnetic attraction means and are capable of pivoting and rotating in the recesses when required. Where all of the recesses across a surface plate have uniform depths, flat fixtures bonded to a number of spheres will be exactly parallel to the surface of the plate when the mounting spheres are engaged in corresponding recesses. Some difficulty may be encountered, however, in directly bonding spherical members 108 to fixtures, since only point contact is achieved, and many otherwise desirable bonding agents do not adhere well to highly-polished metal spheres. These problems are overcome, and several surprising advantages are attained, by the configuration of the support member shown in FIG. 6.

As seen in FIG. 6, sphere 108 is bonded to a thin apertured sheet 130 with the sphere extending through the aperture. This arrangement provides line contact between sphere 108 and the edge of aperture 132 in sheet 130, rather than point contact as would be the case with an unapertured sheet. The edges of aperture 132 in sheet 130 may be chamfered, if desired, to increase the contact area between sphere 108 and sheet 130. Sheet 130 may have a generally toroidal or washer-like shape.

Sphere 108 may be secured to sheet 130 by any suitable means. Typically, an adhesive resin, soldering or brazing may be used. A metallic bond, such as a soldered or brazed bond, is preferred since it is strong and is easily adapted to large scale production of the support assembly.

A very important feature of the preferred support member configuration shown in FIG. 6 is the slight projection of sphere 108 through the aperture 132 in sheet 130. Since the sphere 108 projects beyond the surface of sheet 130 opposite the surface to which it is bonded, a fixture base plate 134 secured to the upper surface of this support member will actually only directly contact sphere 108. Since spheres 108 can be made to highly uniform diameters, the lower surface of planar fixture base plate 134 secured to a number of support members will always be substantially exactly parallel to a surface upon which spheres 108 rest. This slight projection of sphere 108 through aperture 132 also serves to space sheet 130 slightly from the surface of the fixture base plate 134 to be supported. This space is highly desirable where the preferred synthetic resin adhesives are used to bond the support member to the fixture since these resins require an appreciable resin layer thickness. Synthetic resin adhesives, typically epoxy resins, are preferred since they produce a strong bond which can, however, be broken if desired. They cure rapidly and do not require complex equipment, such as ovens, for curing. These resins permit the support members to be secured to fixtures quickly and conveniently by those using this surface plate system.

While sphere 108 may extend through aperture 132 any suitable distance, best results have been obtained where sphere 108 extends from about 0.002 to about 0.008 inch beyond the opposite surface of sheet 130.

While any suitable ferromagnetic material may be used for spheres 108, (or other support member configurations described below) materials having hard, corrosion resistant surfaces are preferred. A thin surface layer (preferably from about 0.00001 to about 0.0002 inch thick) of a non-ferromagnetic material, such as chromium or a flurocarbon resin, may be applied to spheres 108 to improve corrosion resistance, etc., if desired, without severely decreasing the strength of the magnetic forces holding spheres 108 in recesses 110.

Several alternative embodiments of the recessed magnetic attraction means and cooperating support members are shown in FIGS. 8–11. These configurations may be preferred for certain specific applications, although the general configuration shown in FIGS. 6 and 7 is preferred in most cases.

Figure 8:
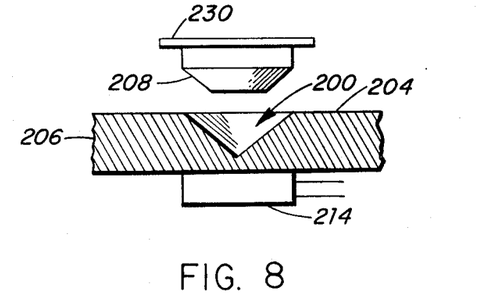
FIGS. 8–11 are vertical sections through alternative embodiments of support members and recess assemblies.

An embodiment which is especially useful with a relatively thin surface plate is shown in FIG. 8. A conical recess 200 is formed directly in the surface 204 of plate 206. Support member 208 has a lower portion in the shape of a truncated cone conforming to the shape of recess 200. Member 208 is secured, directly or indirectly to a base 230 of a measuring or locating fixture. Since there is a space between the apex of recess 200 and member 208 when the unit is assembled, a small amount of dust or other foreign matter in recess 200 will not prevent proper seating of member 208. In this embodiment, the desired magnetic attraction holding member 208 in recess 200 is provided by an electromagnet 214 located on the surface of plate 206 opposite recess 200. While a permanent magnet could be used, if desired, an electromagnet is often preferred, since if ferromagnetic dust or chips are present, they can be brushed away easily when electromagnet 214 is deenergized. Thus, where the surface plate is to be used to hold ferromagnetic workpieces during machining, an electromagnet is preferred.

Figure 10:
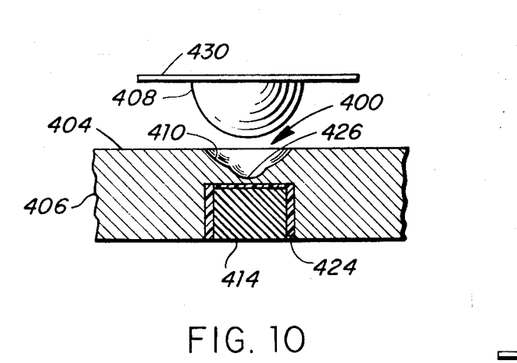

For some purposes, it is preferred that recess 200 be formed directly in the plate surface, as shown in FIGS. 8 and 10. For example, where extreme cleanliness or resistance to chemical attack is required, a plate with a uniform, smooth non-magnetic stainless steel or aluminum surface may be preferred. However, since errors in machining a very large number of recesses across a large plate are difficult to correct, in most instances it will be preferred to form the support member receiving recesses in inserts which are then fitted in openings in the plate surface.

Figure 9:
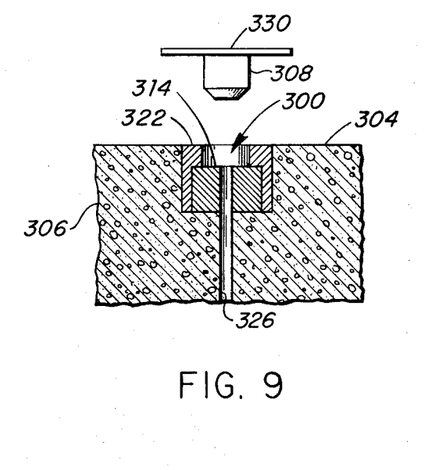

An alternative embodiment utilizing a recess 300 having a generally cylindrical shape is shown in FIG. 9. In this embodiment, the side walls of recess 300 are formed in an insert 322, with a toroidal permanent magnet 314 forming the lower recess surface. The insert assembly is secured in an opening in the surface 304 of plate 306 by any suitable means, such as a synthetic resin adhesive.

Support member 308 is generally cylindrical in shape, corresponding to the shape of recess 300. The lower edges of member 308 are chamfered so that small amounts of dust or other foreign matter in the corners of recess 300 will not prevent proper seating of the member. Member 308 is secured to a fixture base plate 330 by any suitable means. A hole 326 is provided extending through from recess 300 to the bottom of plate 306. Any dust which collects in recess 300 can easily be brushed or swept with an air stream into this hole.

The embodiments shown in FIGS. 8 and 9 permit rotation of the support members in their corresponding recesses only about an axis perpendicular to the plate surface. Thus, these embodiments would not be useful with fixtures of the type shown in FIG. 5. However, they may be especially desirable with fixtures of the sort shown in FIG. 4, since they would assist in maintaining the vertical alignment of the pivot axis during rotation of the fixture.

Another embodiment using a spherical mating surface between member and recess is shown in FIG. 10. Here, recess 400 in surface 404 includes a spherical support portion 410 and a depressed, dust catching, center portion 426. The magnetic attraction forces are provided by a magnet 414 (a permanent or electromagnet) recessed into the surface of plate 406 opposite recess 400 and held in place by adhesive layer 424.

In this instance, support member 408 is in the form of a hemisphere bonded to fixture support plate 430.

Figure 11:
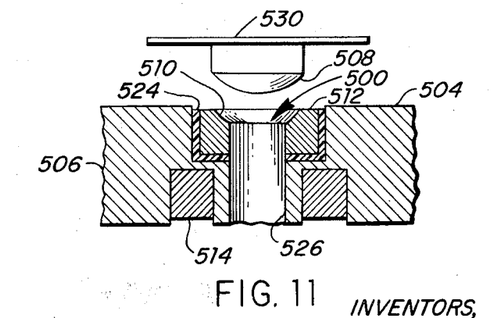

Another embodiment which is especially useful where machining or other operations which produce quantities of ferromagnetic dust, chips, etc., is shown in FIG. 11. Here, a recess 500 includes a spherical ring portion 510, with a large portion of the center of the recess cut away. Recess 500 is formed in an insert 512 which held in an opening in the surface 504 of plate 506 by a filler material 524. Opening 526 extends downwardly from recess 500 through plate 506. A toroidal magnet 514 is recessed in a toroidal opening in the surface of plate 506 opposite insert 512. Magnet 514 is preferably an electromagnet, so that it can be deenergized while ferromagnetic particles on surface 504 and insert 512 are being brushed or swept by an air stream into opening 526.

Support member 508 in this instance consists of a spherical surface formed on the end of a cylindrical member secured to a fixture support plate 530.

Although specific proportions, materials and arrangements have been described in the above description of preferred embodiments, these may be varied within the scope of this disclosure, depending on specific end use requirements, with similar results. For example, a variety of support member shapes, magnet locations, etc. may be considered when selecting a system for a particular application.

Other modifications, ramifications and applications of the invention will become apparent to those skilled in the art upon reading the present disclosure. These are intended to be included within the scope of this invention, as defined in the appended claims.

We claim:

1. A locating and measuring method comprising the steps of:

a. locating a magnetic attraction means adjacent to each of a plurality of substantially uniform recesses spaced across a surface;

b. placing a master workpiece on said surface;

c. placing a plurality of ferromagnetic support members having shapes corresponding to said recesses in selected recesses adjacent to said master workpiece;

d. affixing measuring and locating fixtures to groups of said support members while said fixtures are aligned with said master workpiece;

e. removing said master workpiece and any of said fixtures from said surface; and f. placing a workpiece on said surface and reinstalling any removed fixtures, whereby physical characteristics of said workpiece may be compared with those of said master workpiece.

2. The method according to claim 1 including the further steps of providing at least some threaded openings in said plate surface and securing at least one of said workpiece and fixtures to said plate by threading clamp bolts into at least some of said threaded openings.

3. The method according to claim 1 wherein said recesses are formed in insert members which contain permanent magnets, and each insert member is installed in an opening in said plate surface.

4. The method according to claim 1 wherein said support members are affixed to said fixtures by adhesive bonding.

5. The method according to claim 1 wherein said recesses are formed in a substantially uniform geometric pattern across a substantially planar surface.

6. The method according to claim 1 including the further step of machining said workpiece while said workpiece is positioned on said surface.

7. A locating and measuring method comprising the steps of:
 a. locating magnetic attraction means adjacent to each recess of a plurality of substantially uniform recesses spaced across a surface;
 b. supplying a plurality of fixtures each of which is mounted on at least one ferromagnetic support member, said support members being shaped and spaced to correspond to the shapes and spacing of said recesses;
 c. pre-setting adjustable locating members and gages carried by said fixtures to conform to selected workpiece dimensions;
 d. installing said fixtures on said surface with said support members engaged in selected recesses;
 e. placing a workpiece on said surface in operative relationship to said fixtures; whereby said workpiece is accurately positioned on said surface and workpiece dimensions may be measured.

8. The method according to claim 7 including the further steps of at least once removing said workpiece and any of said fixtures from said surface and reinstalling any removed fixtures and another workpiece on said surface, whereby the dimensions of a series of workpieces may be quickly measured.

9. The method according to claim 7 including the further step of machining said workpiece while said workpiece is positioned on said surface.

10. The method according to claim 9 including the further steps of at least once removing a workpiece and any of said fixtures from said surface after machining and reinstalling any removed fixtures and another workpiece on said surface, whereby a series of workpieces may be quickly and accurately machined.

11. The method according to claim 7 including the further steps of providing at least some threaded openings in said surface and securing at least one of said workpiece and fixtures to said plate by threading clamp bolts into at least some of said threaded openings.

12. The method according to claim 7 wherein said recesses are formed in insert members which contain permanent magnets, and each insert member is installed in an opening in said surface.

13. In a locating and measuring method which comprises the steps of arranging a master workpiece in an operative relationship to a surface, locating inspection fixtures on said surface in alignment with said master workpiece, then replacing said master workpiece with a workpiece to be inspected, and comparing physical characteristics of said workpiece to those of the master workpiece by means of said inspection fixtures, the improvement comprising the steps of forming in said surface a plurality of spaced recesses having uniform sizes and shapes, locating magnetic attraction means adjacent to each recess, placing a number of ferromagnetic support members having shapes corresponding to said recesses in recesses adjacent to said master workpiece, placing said fixtures on a group of said members, aligning said fixtures with said master workpiece and securing said fixtures to said members, whereby said fixtures may be removed and replaced in substantially the exact original position.

14. The method according to claim 13 including the further steps of forming at least some threaded openings in said plate surface and securing at least some of said workpiece and fixtures to said plate by threading clamp bolts into at least some of said threaded openings.

15. The method according to claim 13 wherein said magnetic attraction means is provided by placing the permanent magnet means within said plate adjacent to said recesses.

16. The method according to claim 13 wherein said recesses are formed in a substantially uniform geometric pattern across a substantially planar surface.

17. In a locating and measuring method which comprises the steps of positioning a plurality of measuring and locating fixtures across a surface in accordance with selected workpiece dimensions, placing a workpiece on said surface in an operative relationship to said fixtures and comparing the dimensions of said workpiece with said selected dimensions; the improvement comprising the steps of forming in said surface a plurality of spaced recesses of substantially uniform shape and spacing, locating magnetic attraction means adjacent each recess, mounting each of said fixtures on a plurality of ferromagnetic support members having shapes and spacings corresponding to said recesses, and pre-adjusting each of said fixtures to conform to the selected workpiece dimensions, whereby said fixtures may be removed and replaced in substantially the exact original position.

18. The method according to claim 17 including the further steps of forming at least some threaded openings in said plate surface and securing at least one of said workpiece and fixtures to said plate by threading clamp bolts into at least some of said threaded openings.

19. The method according to claim 17 including the further step of machining a portion of said workpiece while said work piece is located on said surface.

20. The method according to claim 17 wherein said recesses are formed in a substantially uniform geometric pattern across a substantially planar surface.

* * * * *